United States Patent
Degen et al.

(10) Patent No.: US 12,525,886 B2
(45) Date of Patent: Jan. 13, 2026

(54) CONVERTER CIRCUIT

(71) Applicant: NXP USA, Inc., Austin, TX (US)

(72) Inventors: Peter Theodorus Johannes Degen, Arnhem (NL); Kimmo Petteri Salo, Elst (NL); Frank van Rens, Horst (NL)

(73) Assignee: NXP USA, Inc., Austin, TX (US)

( * ) Notice: Subject to any disclaimer, the term of this patent is extended or adjusted under 35 U.S.C. 154(b) by 281 days.

(21) Appl. No.: 18/338,604

(22) Filed: Jun. 21, 2023

(65) Prior Publication Data

US 2024/0429826 A1 Dec. 26, 2024

(51) Int. Cl.
*H02M 3/335* (2006.01)
*H02M 1/00* (2007.01)
*H02M 1/38* (2007.01)
*H02M 3/00* (2006.01)

(52) U.S. Cl.
CPC ..... *H02M 3/33571* (2021.05); *H02M 1/0058* (2021.05); *H02M 1/38* (2013.01); *H02M 3/01* (2021.05)

(58) Field of Classification Search
CPC .... H02M 1/0029; H02M 1/0058; H02M 1/38; H02M 3/01; H02M 3/158; H02M 3/1588; H02M 3/33569; H02M 3/33571
See application file for complete search history.

(56) References Cited

U.S. PATENT DOCUMENTS

| | | | |
|---|---|---|---|
| 10,389,275 B2 | 8/2019 | Notsch | |
| 2017/0077821 A1* | 3/2017 | Namekawa | ....... H02M 3/33571 |
| 2017/0288555 A1* | 10/2017 | Trevisan | ........... H02M 3/33523 |
| 2018/0054118 A1* | 2/2018 | Lee | ........................ H02M 3/157 |
| 2018/0367042 A1 | 12/2018 | Andersen et al. | |
| 2020/0295650 A1 | 9/2020 | Medina-Garcia | |
| 2021/0391784 A1 | 12/2021 | Johnson et al. | |
| 2022/0123647 A1 | 4/2022 | Mayell et al. | |
| 2023/0318462 A1* | 10/2023 | Medina-Garcia | ....... H02M 3/01 363/21.01 |

FOREIGN PATENT DOCUMENTS

KR 100825536 B1 4/2008

OTHER PUBLICATIONS

Goebel Lukas et al.; "Resonant Switching and Power Control of DC-DC-Converters with a Variable Transmission Path"; 2018 20th European Conference on Power Electronics and Applications; Sep. 17, 2018; 9 pages.

* cited by examiner

*Primary Examiner* — Fred E Finch, III

(57) ABSTRACT

One example discloses a converter circuit, including: an input configured to receive either a voltage or a current; an output configured to transmit either a voltage or a current; a voltage reference; a half-bridge (HB) node; a high-side (HS) switch coupled between the input and the HB node; a low-side (LS) switch coupled between the voltage reference and the HB node; and a controller coupled to the HB node, the HS switch, and the LS switch; wherein the controller is configured to send a first command signal after a first regulated time to turn on the HS switch after an HB voltage on the HB node begins rising in response to the LS switch having been turned off.

19 Claims, 4 Drawing Sheets

CONVERTER CIRCUIT

The present specification relates to systems, methods, apparatuses, devices, articles of manufacture and instructions for voltage and current converter circuits.

SUMMARY

According to an example embodiment, a converter circuit, comprising: an input configured to receive either a voltage or a current; an output configured to transmit either a voltage or a current; a voltage reference; a half-bridge (HB) node; a high-side (HS) switch coupled between the input and the HB node; a low-side (LS) switch coupled between the voltage reference and the HB node; and a controller coupled to the HB node, the HS switch, and the LS switch; wherein the controller is configured to send a first command signal after a first regulated time to turn on the HS switch after an HB voltage on the HB node begins rising in response to the LS switch having been turned off.

In another example embodiment, the controller is configured to send the first command signal after the first regulated time to turn on the HS switch before the HB voltage on the HB node stops rising in response to the LS switch having been turned off.

In another example embodiment, the first regulated time is less than a total time that the HB voltage is rising.

In another example embodiment, the first regulated time is equal to a total time that the HB voltage is rising minus a first measured time.

In another example embodiment, if the first measured time is less than a first target time, the controller is configured to decrease the first regulated time.

In another example embodiment, if the first measured time is greater than the first target time, the controller is configured to increase the first regulated time.

In another example embodiment, the controller is configured to send a second command signal after a second regulated time to turn on the LS switch after the HB voltage on the HB node begins falling in response to the HS switch having been turned off.

In another example embodiment, the second regulated time is less than a total time that the HB voltage is falling.

In another example embodiment, the second regulated time is equal to a total time that the HB voltage is falling minus a second measured time.

In another example embodiment, if the second measured time is less than a second target time, the controller is configured to decrease the second regulated time.

In another example embodiment, if the second measured time is greater than the second target time, the controller is configured to increase the second regulated time.

In another example embodiment, the converter circuit is embedded in a switch mode power supply (SMPS).

In another example embodiment, the converter circuit is embedded in an AC to DC converter.

In another example embodiment, the voltage reference is a ground reference.

In another example embodiment, further comprising an inductor coupled between the half-bridge node and the transformer.

In another example embodiment, further comprising a transformer coupled between the half-bridge node and a resonant capacitor.

In another example embodiment, the converter circuit is either a resonant converter circuit or a AHB (Asymmetrical Half Bridge) converter circuit.

According to an example embodiment, a converter circuit, comprising: an input; an output; a voltage reference; a half-bridge (HB) node; a high-side (HS) switch coupled between the input and the HB node; a low-side (LS) switch coupled between the voltage reference and the HB node; and a controller coupled to the HB node, the HS switch, and the LS switch; wherein the controller is configured to send a command signal after a regulated time to turn on the LS switch after an HB voltage on the HB node begins falling in response to the HS switch having been turned off.

The above discussion is not intended to represent every example embodiment or every implementation within the scope of the current or future Claim sets. The Figures and Detailed Description that follow also exemplify various example embodiments.

Various example embodiments may be more completely understood in consideration of the following Detailed Description in connection with the accompanying Drawings.

Figure 1:
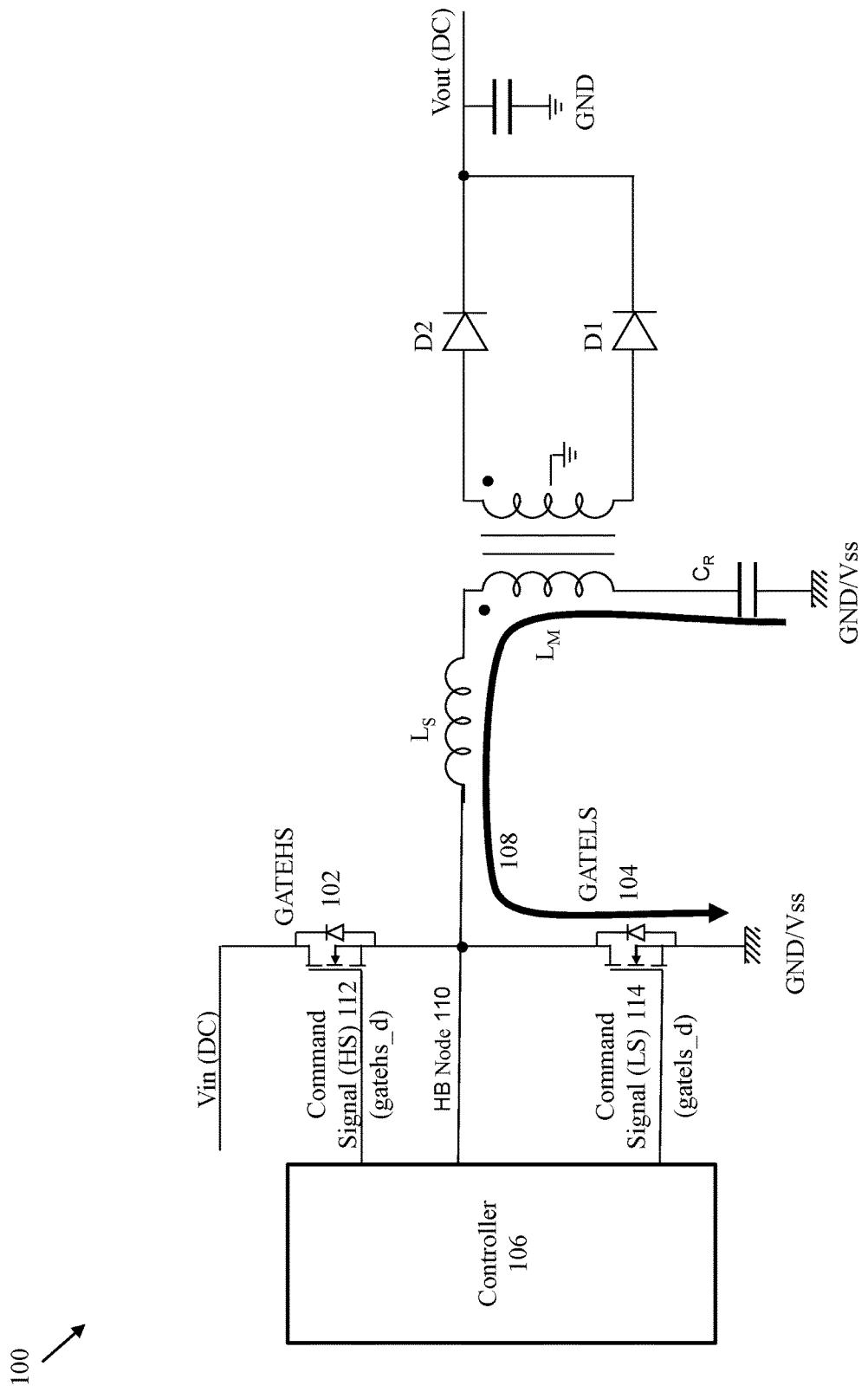
FIG. 1 represents a first example of a resonant converter.

While the disclosure is amenable to various modifications and alternative forms, specifics thereof have been shown by way of example in the drawings and will be described in detail. It should be understood, however, that other embodiments, beyond the particular embodiments described, are possible as well. All modifications, equivalents, and alternative embodiments falling within the spirit and scope of the appended claims are covered as well.

DETAILED DESCRIPTION

Power supplies are ubiquitous for converting an AC mains voltage into a lower DC voltage which is appropriate to a particular application. They are used for mobile devices, edge devices, computers, smartphones, electric cars, smart TVs, gaming consoles, etc. as either adapters or embedded power supplies.

AC to DC power converters are a common type of power supply, some of which are configured as resonant power converters. Some resonant power converters include Switch Mode Power Supplies (SMPS) circuits. To reduce a size of such resonant power converters, an operating frequency of the resonant power converters can be increased. However, one of the limits to operating at higher frequencies is accurate control of a non-overlap time between switching elements such that hard-switching is avoided. A power converter mostly consists of a first AC to DC stage and second DC to DC stage. So the overall power converter is AC to DC. A resonant converter (as discussed below in FIG. 1) is about the second stage which is then DC to DC.

FIG. 1 represents a first example of a resonant converter 100. The resonant converter 100 includes an input (e.g. for receiving Vin (DC)), an output (e.g. for presenting Vout (DC)), a voltage reference (GND/Vss), a high-side (HS) mosfet 102 switch, a low-side (LS) mosfet 104 switch, a controller 106, and half-bridge (HB) node 110. In various example embodiments the converter 100 is configured to receive either a voltage or a current at the input and transmit either a voltage or a current at the output.

During operation of the resonant converter 100: a resonant current 108 flows through the high-side (HS) mosfet 102 and the resonant tank (Ls, Lm, CR) or the low-side (LS) mosfet 104 and the resonant tank (Ls, Lm, CR); an HB voltage rises and falls at the half-bridge (HB) node 110 and is monitored by the controller 106; and the controller 106 respectively sends command signal (HS) 112 (gatehs_d) and command signal (LS) 114 (gatels_d) to the high-side (HS) mosfet 102 and the low-side (LS) mosfet 104 switches.

In normal resonant converter 100 operation, the resonant current 108 flows in both positive and negative directions. When the high-side (HS) mosfet 102—is turned off, the resonant current 108 flows in one (e.g. positive) direction. Initially the resonant current remains flowing in this positive direction, discharging the HB node. Once the HB node is discharged to a minimum level (typically equal to the ground level), the low-side (LS) mosfet 104 is turned. Due to the resonance, the current changes direction to the opposite (e.g. negative) direction. When the low-side (LS) mosfet 104 is turned off, the current still flows in this negative direction charging the HB node. When the HB node is charged to the maximum level (typically equal to the input voltage) the high-side (HS) mosfet 102 is turned on again. Due to the resonance, the current changes direction to the opposite (e.g. positive) direction, and it all repeats from the beginning.

Various other circuit elements are also shown (e.g. inductor LS, transformer w/Lm, resonant capacitor CR, rectification diodes D1 and D2, and an output capacitor at Vout). These elements may or may not exist in various example embodiments and/or may be supplemented or replaced with additional circuits depending up a particular application.

Figure 2:
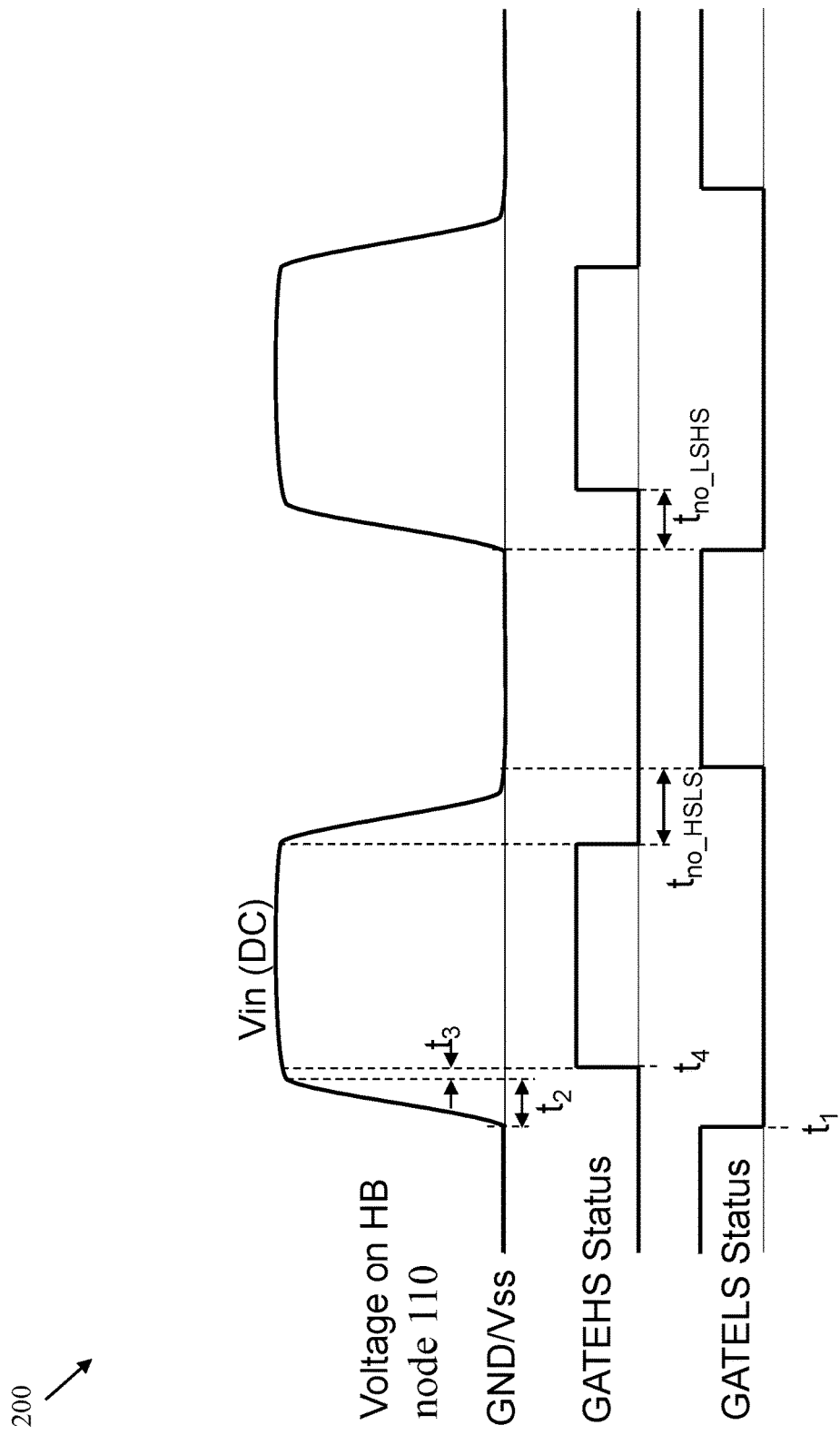
FIG. 2 represents a first example operational timing diagram of the resonant converter.

FIG. 2 represents a first example operational timing diagram 200 of the resonant converter 100. During the resonant converter's 100 operation, when the LS mosfet 104 is turned off by the command signal (LS) 114 at time ($t_1$), the resonant current 108 initially charges the half-bridge (HB) node voltage during time ($t_2$) before finally flowing through the high-side (HS) mosfet's 102 backgate diode at time ($t_3$).

If the controller 106 waits until the half-bridge (HB) node voltage 110 is equal to Vin (DC) before turning the high-side (HS) mosfet 102 on by the command signal (HS) 112 at time ($t_4$), then a voltage across the high-side (HS) mosfet 102 will already be substantially zero which minimizes the switching losses. This is called "zero voltage switching".

A time between actually turning off the low-side (LS) mosfet 104 (i.e. GATELS status) and actually turning on the high-side (HS) mosfet 102 (i.e. GATEHS status) is called an LSHS non-overlap time ($t_{no\_LSHS}$).

Similarly after the high-side (HS) mosfet 102 is turned off by the command signal (HS) 112 and the low-side (LS) mosfet 104 is turned on by the command signal (LS) 114 is called an HSLS non-overlap time ($t_{no\_HSLS}$), except that the resonant current 108 flows in the opposite direction. In this case, the half-bridge (HB) node voltage 110 is discharged before the controller 106 turns the low-side (LS) mosfet 104 on.

Both of these non-overlap times ($t_{no}$) (i.e. $t_{no\_LSHS}$ or $t_{no\_HSLS}$) should neither be too small nor too big so as to assure zero voltage switching (i.e. prevent hard-switching).

While the controller 106 includes circuits and/or instructions for automatically varying these non-overlap times, optimal non-overlap times ($t_{no}$) vary depending upon a particular resonant converter's 100 application values (i.e. specific component, voltage and current static and operational parameters).

Further, as a resonant converter's 100 operational frequency increases, the non-overlap times become smaller. For example, while at low frequencies the non-overlap time can be up to 1 us, at higher frequencies the non-overlap time can go down to 100 ns.

Figure 3:
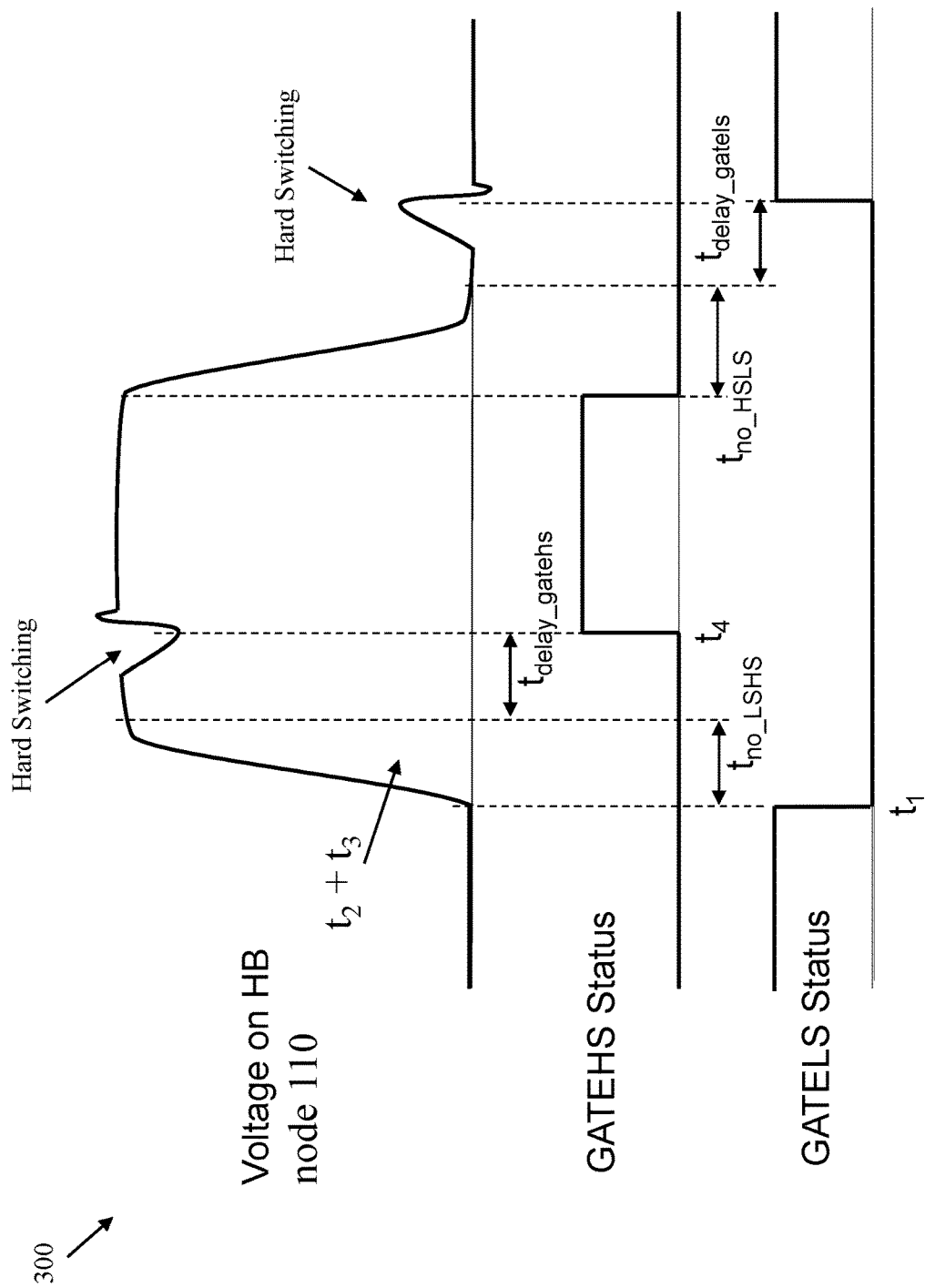
FIG. 3 represents a second example operational timing diagram of the resonant converter.

FIG. 3 represents a second example operational timing diagram 300 of the resonant converter 100. After $t_{no\_LSHS}$, the controller 106 detects that the rising edge (t2+t3) of the voltage at the half-bridge (HB) node 110 has ended.

However, given that the high-side (HS) mosfet 102 (and similarly the low-side (LS) mosfet 104) does not turn on instantaneously after their respective command signals (LS/HS) 112, 114 are sent by the controller 106, there is still a $t_{delay\_gatehs}$ time (which is typically around 150 ns) before the high-side (HS) mosfet 102 is actively on (GATEHS).

Since the resonant current 108 has already reversed direction, the voltage at the half-bridge (HB) node 110 is already falling before the high-side (HS) mosfet 102 is turned on. This causes hard-switching which reduces the efficiency and the lifetime of the high-side (HS) mosfet 102. This hard-switching also occurs when the low-side (LS) mosfet 104 is turned on (GATELS) by the controller 106 using the command signal (LS) 114 later in the switching cycle and would similarly reduce the efficiency and the lifetime of the low-side (LS) mosfet 104.

While the high-side (HS) mosfet 102 turn on delay (i.e. $t_{delay\_gatehs}$) (e.g. the difference between the command signal (HS) 112 and GATEHS change) may be neglectable at low resonant converter 100 operational frequencies, such a turn on delay becomes unacceptable at high operational frequencies, and could make automatic non-overlap time control problematic.

Similarly for the low-side (LS) mosfet 104 turn on delay (i.e. $t_{delay\_gatels}$) (e.g. the difference between the command signal (LS) 114 and GATELS change).

Even replacing the controller's 106 automatic non-overlap time with a fixed non-overlap time, would require circuit by circuit trimming depending upon the resonant converter's 100 application values and would limit a particular fixed non-overlap time to a particular resonant converter 100 operational frequency.

Now discussed is a configuration for the controller 106 that enables automatic non-overlap time adjustments that work for both low and high resonant converter 100 operational frequencies, and is independent of the resonant converter's 100 application values (e.g. specific circuit components, operational voltages and frequencies, aging of any circuit components, temperature effects, and either load and/or input voltage variations.

Figure 4:
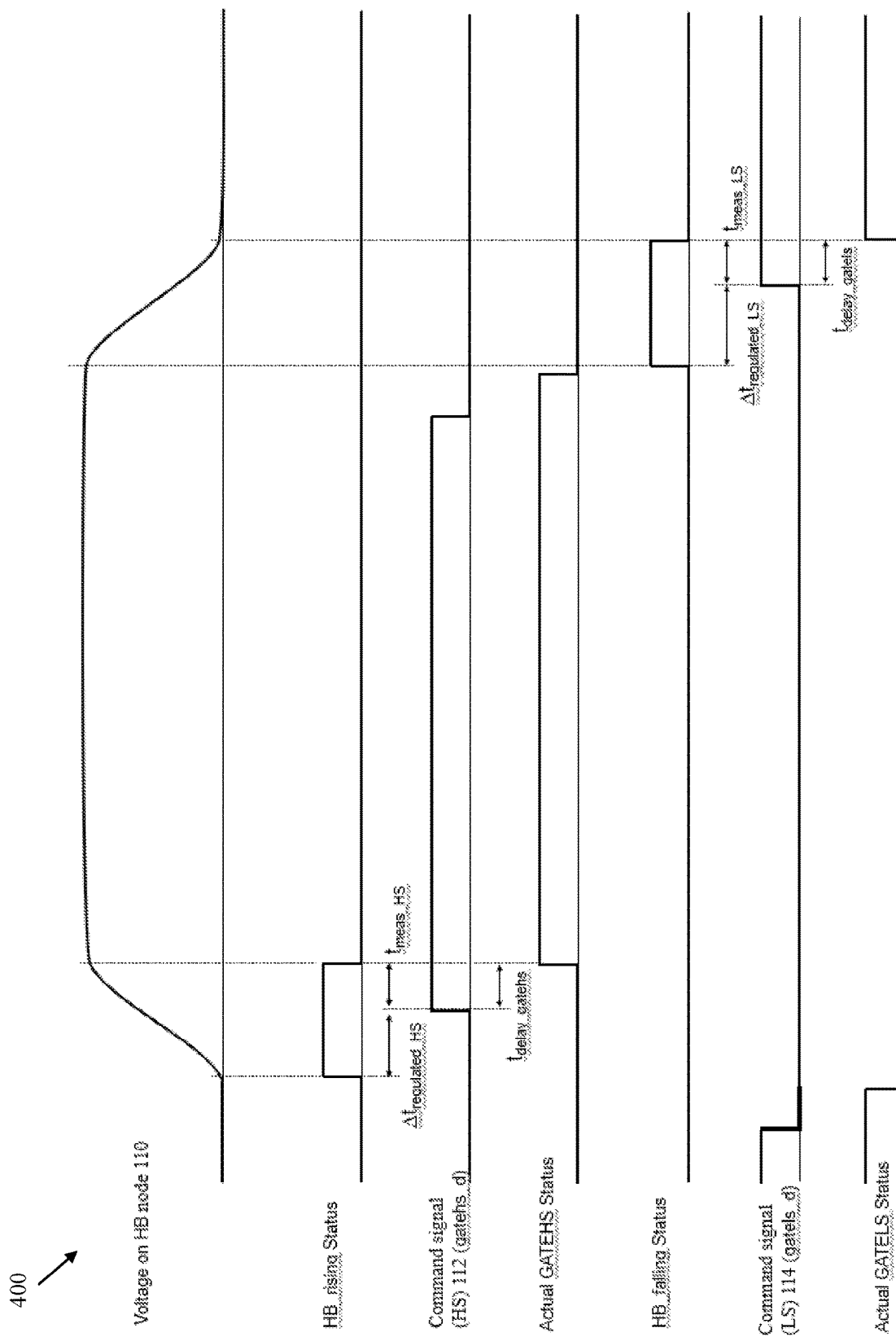
FIG. 4 represents a third example operational timing diagram of the resonant converter.

FIG. 4 represents a third example operational timing diagram 400 of the resonant converter 100. In this example 400, when the low-side (LS) mosfet 104 is turned off the voltage on the half-bridge (HB) node 110 rises. This HB_rising voltage on the half-bridge (HB) node 110 is detected by the controller 106. When the voltage on the half-bridge (HB) node 110 stops rising, the controller 106 sets the HB_rising status to low.

If the controller 106 waits until HB_rising is set to low before sending the command signal (HS) 112 (gatehs_d) to turn on the high-side (HS) mosfet 102, there will likely be hard-switching at high frequencies due to internal and external delays in both the controller 106 and the high-side (HS) mosfet 102. Thus it would take some extra time before the high-side (HS) mosfet 102 would be actively on (i.e. GATEHS status goes high).

Since during this delay the resonant current 108 already might change direction, to avoid hard-switching the high-side (HS) mosfet 102 should be actively on (i.e. GATEHS status goes high) at the moment the HB_rising signal goes low.

The controller 106 achieves such a zero voltage switching scenario by turning on the high-side (HS) mosfet 102 even before the end of the rising edge of the HB node voltage, since waiting to send the command signal (HS) 112 (gatehs_d) for HB_rising goes low would cause hard-switching.

This is achieved by configuring the controller 106 to send the command signal (HS) 112 (gatehs_d) after a first regulated time ($\Delta t_{regulated\_HS}$) to turn on the high-side (HS) mosfet 102 after the HB voltage on the HB node 110 begins rising, in response to the low-side (LS) mosfet 104 having been turned off, but which is less than (i.e. before) a total time that the HB node 110 voltage is rising.

First the controller 106 defines the first regulated time ($\Delta t_{regulated\_HS}$) as equal to a total time that the HB voltage is rising (i.e. the HB_rising duration) minus a first measured time ($t_{meas\_HS}$). Next the controller 106 compares the first measured time ($t_{meas\_HS}$) to a first target time ($t_{delay\_gatehs}$).

If the first measured time ($t_{meas\_HS}$) is less than the first target time ($t_{delay\_gatehs}$), the controller 106 decreases the first regulated time ($\Delta t_{regulated\_HS}$). However, if the first measured time ($t_{meas\_HS}$) is greater than the first target time ($t_{delay\_gatehs}$), then the controller 106 increases the first regulated time ($\Delta t_{regulated\_HS}$).

Similarly for the low-side (LS) mosfet 104. The controller 106 is configured to send the command signal (LS) 114 (gatels_d) after a second regulated time ($\Delta t_{regulated\_LS}$) to turn on the low-side (LS) mosfet 104 after the HB voltage on the half-bridge (HB) node 110 begins falling in response to the high-side (HS) mosfet 102 having been turned off.

The second regulated time ($\Delta t_{regulated\_LS}$) is equal to a total time that the HB voltage is falling minus a second measured time ($t_{meas\_LS}$). If the second measured time ($t_{meas\_LS}$) is less than a second target time ($t_{delay\_gatels}$), the controller 106 is configured to decrease the second regulated time ($\Delta t_{regulated\_LS}$). However, if the second measured time ($t_{meas\_LS}$) is greater than the second target time ($t_{delay\_gatels}$), the controller 106 is configured to increase the second regulated time ($\Delta t_{regulated\_LS}$);

Applying the above discussion to the HB_rising portion of the half-bridge (HB) node 110 voltage curve, the first regulated time ($\Delta t_{regulated\_HS}$) can initially be set equal to a prior measured width of the HB_rising signal. The controller 106 then targets a fixed delay (i.e. first target time ($t_{delay\_gatehs}$)) between gatehs_d (start to turn on the high-side (HS) mosfet 102) and the end of the rising edge of HB ($t_{delay\_gatehs}$).

If the measured time between gatehs_d and the end of the rising edge of the HB node ($t_{meas\_HS}$) is above or below the first target time ($t_{delay\_gatehs}$), the value of $\Delta t_{regulated\_HS}$ is then respectively reduced or increased so that at the next cycle the half-bridge (HB) node 110 voltage curve the measured delay $t_{meas\_HS}$ is closer to the first target time ($t_{delay\_gatehs}$).

In this way, the controller 106 can ensure that the high-side (HS) mosfet 102 switch is turned on at the exact right moment to prevent hard-switching.

The above the high-side (HS) mosfet 102 switching discussion above can be applied to the low-side (LS) mosfet 104 switch as well.

The first regulated time ($\Delta t_{regulated\_HS}$) and the second regulated time ($\Delta t_{regulated\_LS}$) thus take into account not only of all mosfet turn-on delays, but also of any other delays in the resonant converter 100 affecting the non-overlap times (e.g. comparator delays, controller's 106 internal digital switching delays, etc.).

A rate in which the controller 106 increases or decreases the $\Delta t_{regulated\_HS}$ can also be varied, perhaps using a filtering circuit and/or routine in the controller 106, so the controller 106 regulates $\Delta t_{regulated\_HS}$ to the required value as quickly or slowly as a particular application needs.

These controller 106 configurations are independent of application values (e.g. circuit components, circuit design, operating voltages and frequencies, output loads and the steepness of rising and falling voltage changes on the half-bridge (HB) node 110.

Various instructions and/or operational steps discussed in the above Figures can be executed in any order, unless a specific order is explicitly stated. Also, those skilled in the art will recognize that while some example sets of instructions/steps have been discussed, the material in this specification can be combined in a variety of ways to yield other examples as well, and are to be understood within a context provided by this detailed description.

In some example embodiments these instructions/steps are implemented as functional and software instructions. In other embodiments, the instructions can be implemented either using logic gates, application specific chips, firmware, as well as other hardware forms.

When the instructions are embodied as a set of executable instructions in a non-transitory computer-readable or computer-usable media which are effected on a computer or machine programmed with and controlled by said executable instructions. Said instructions are loaded for execution on a processor (such as one or more CPUs). Said processor includes microprocessors, microcontrollers, processor modules or subsystems (including one or more microprocessors or microcontrollers), or other control or computing devices. A processor can refer to a single component or to plural components. Said computer-readable or computer-usable storage medium or media is (are) considered to be part of an article (or article of manufacture). An article or article of manufacture can refer to any manufactured single component or multiple components. The non-transitory machine or computer-usable media or mediums as defined herein excludes signals, but such media or mediums may be capable of receiving and processing information from signals and/or other transitory mediums.

It will be readily understood that the components of the embodiments as generally described herein and illustrated in the appended figures could be arranged and designed in a wide variety of different configurations. Thus, the detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

What is claimed is:

1. A converter circuit, comprising:
   an input configured to receive either a voltage or a current;
   an output configured to transmit either a voltage or a current;
   a voltage reference;
   a half-bridge (HB) node;
   a high-side (HS) switch coupled between the input and the HB node;
   a low-side (LS) switch coupled between the voltage reference and the HB node; and
   a controller coupled to the HB node, the HS switch, and the LS switch;
   wherein the controller is configured to send a first command signal after a first regulated time to turn on the HS switch after an HB voltage on the HB node begins rising in response to the LS switch having been turned off;
   wherein the first regulated time is equal to a total time that the HB voltage is rising minus a first measured time; and
   wherein if the first measured time is less than a first target time, the controller is configured to decrease the first regulated time.

2. The circuit of claim 1:
   wherein the controller is configured to send the first command signal after the first regulated time to turn on the HS switch before the HB voltage on the HB node stops rising in response to the LS switch having been turned off.

3. The circuit of claim 1:
   wherein the first regulated time is less than a total time that the HB voltage is rising.

4. The circuit of claim 1:
   wherein the first target time is a fixed time.

5. The circuit of claim 1:
   wherein if the first measured time is greater than the first target time, the controller is configured to increase the first regulated time.

6. The circuit of claim 1:
   wherein the controller is configured to send a second command signal after a second regulated time to turn on the LS switch after the HB voltage on the HB node begins falling in response to the HS switch having been turned off.

7. The circuit of claim 6:
   wherein the second regulated time is less than a total time that the HB voltage is falling.

8. The circuit of claim 6:
   wherein the second regulated time is equal to a total time that the HB voltage is falling minus a second measured time.

9. The circuit of claim 8:
   wherein if the second measured time is less than a second target time, the controller is configured to decrease the second regulated time.

10. The circuit of claim 9:
    wherein if the second measured time is greater than the second target time, the controller is configured to increase the second regulated time.

11. The circuit of claim 1:
    wherein the converter circuit is embedded in a switch mode power supply (SMPS).

12. The circuit of claim 1:
    wherein the converter circuit is embedded in an AC to DC converter.

13. The circuit of claim 1:
    wherein the voltage reference is a ground reference.

14. The circuit of claim 1:
    further comprising an inductor coupled between the half-bridge node and a transformer.

15. The circuit of claim 1:
    further comprising a transformer coupled between the half-bridge node and a resonant capacitor.

16. The circuit of claim 1:
    wherein the converter circuit is either a resonant converter circuit or a AHB (Asymmetrical Half Bridge) converter circuit.

17. A converter circuit, comprising:
    an input;
    an output;
    a voltage reference;
    a half-bridge (HB) node;
    a high-side (HS) switch coupled between the input and the HB node;
    a low-side (LS) switch coupled between the voltage reference and the HB node; and
    a controller coupled to the HB node, the HS switch, and the LS switch;
    wherein the controller is configured to send a command signal after a regulated time to turn on the LS switch after an HB voltage on the HB node begins falling in response to the HS switch having been turned off;
    wherein the regulated time is equal to a total time that the HB voltage is falling minus a measured time; and
    wherein if the measured time is less than a target time, the controller is configured to decrease the regulated time.

18. A converter circuit, comprising:
    an input configured to receive either a voltage or a current;
    an output configured to transmit either a voltage or a current;
    a voltage reference;
    a half-bridge (HB) node;
    a high-side (HS) switch coupled between the input and the HB node;
    a low-side (LS) switch coupled between the voltage reference and the HB node; and
    a controller coupled to the HB node, the HS switch, and the LS switch;

wherein the controller is configured to send a first command signal after a first regulated time to turn on the HS switch after an HB voltage on the HB node begins rising in response to the LS switch having been turned off;

wherein the first regulated time is equal to a total time that the HB voltage is rising minus a first measured time; and wherein if the first measured time is greater than the first target time, the controller is configured to increase the first regulated time.

19. The circuit of claim 17:

wherein the target time is a fixed time.

* * * * *